A. HEIL.
GALVANIC BATTERY.
APPLICATION FILED JAN. 14, 1911.
1,028,354.
Patented June 4, 1912.
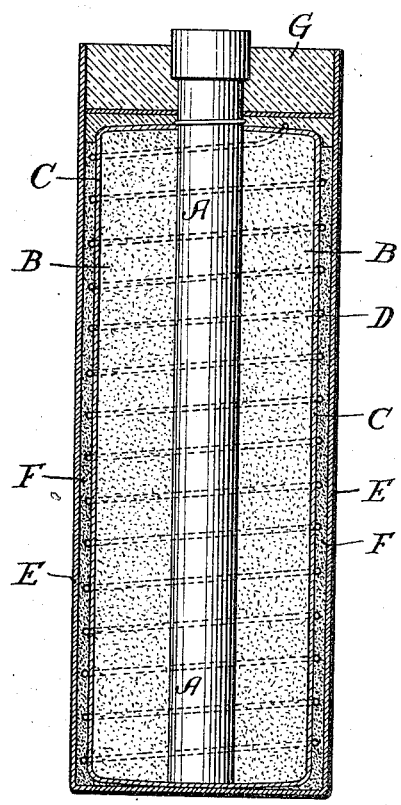
WITNESSES
INVENTOR
Albrecht Heil
BY
Henry D. Williams
ATTORNEY

UNITED STATES PATENT OFFICE.

ALBRECHT HEIL, OF FRANKFORT-ON-THE-MAIN, GERMANY.

GALVANIC BATTERY.

1,028,354.  Specification of Letters Patent.  Patented June 4, 1912.

Application filed January 14, 1911. Serial No. 602,559.

*To all whom it may concern:*

Be it known that I, ALBRECHT HEIL, a subject of the Emperor of Germany, residing at Weberstrasse 48, Frankfort-on-the-Main, Germany, have invented certain new and useful Improvements in Galvanic Batteries, of which the following is a specification, reference being had therein to the accompanying drawings, forming part thereof.

My invention relates to galvanic batteries, and particularly to dry batteries, and has for its objects to provide for the amalgamation of the zinc elements in a gradual and thorough manner.

To avoid the local action caused by impurities in the zinc, the surface of the zinc is ordinarily alloyed or amalgamated with mercury, but such amalgamation by ordinary methods is superficial and does not deeply penetrate into the mass of the zinc. Further, if the mercury is applied in large quantities, some of it will flow off the zinc and create a short circuit between the electrodes or other annoyances will result, such as the dissolving of the soldering seam of the zinc cup. To avoid this it has been proposed to amalgamate the zinc by adding a mercury solution to the paste which is the electrolyte of the cell, whereby the mercury in the paste may slowly permeate the zinc of the electrode and thoroughly amalgamate it. However it has been found that in such a process the mercury almost immediately separates from the paste in a spongy consistency and coats the surface of the zinc and at the same time forms a bridge between the two electrodes, thus creating a short circuit and soon exhausting the cell.

As is well known, it is usual in zinc-carbon cells to employ a depolarizing mass about the cathode, and such depolarizing mass is frequently wrapped with a thin cotton or other fabric forming a highly porous envelop. I have discovered that if the depolarizing mass be moistened with a mixture of a suitable mercury compound, such as mercuric oxid, and of dissolved salts of the electrolyte, and the electrolytic paste be free of the mercury compound when the battery is first made, the mercury compound will gradually be dissolved and in small quantities will pass through the porous envelop and diffuse through the paste to the zinc element without short-circuiting the cell, and the zinc will take up the mercury and become very slowly, but very thoroughly, amalgamated. The amalgamation proceeds very gradually and takes a comparatively long time to thoroughly impregnate the zinc, but tests have proven that there is an absence of the gray, spongy mercury passing through the electrolytic paste, and that sheet zinc substantially one-fifth of an inch thick becomes amalgamated almost if not entirely through. An anode subjected to this amalgamating process for a few weeks can be easily broken, and the broken faces will be silver-white, thus showing the thoroughness of the amalgamation. The zinc at all times presents an entirely clean surface.

In the accompanying drawing I have shown a central vertical section of a cell embodying my invention.

The carbon electrode A is surrounded by a mass of suitable depolarizing material B, such as manganese dioxid and pulverized carbon, in which is mixed a suitable mercury compound, such as mercuric oxid, and dissolved salts of the electrolyte, as explained above. This depolarizing mass is inclosed in a suitable porous bag C, which is secured to the carbon electrode A by a cord D. The zinc electrode is the inclosing cup E, and a suitable electrolytic paste F, such as sal ammoniac, is contained within the cup about the bag C. Binding posts are provided on the electrodes, and a suitable sealing mixture G, such as asphaltum, is employed to seal up the cell.

I claim:

1. In a dry battery cell, in combination, a negative element, a depolarizing mass containing a mercury compound, an electrolytic paste having no mercury compound therein when the battery is first made, and a zinc element, the parts being so combined that the mercury compound will be slowly dissolved by the electrolytic paste and pass through the electrolytic paste into amalgamating contact with the zinc element.

2. In a dry battery cell, in combination, an electrolytic paste free of mercury compound when the battery is first made, a negative element, a depolarizing mass therefor moistened with a mixture of a mercury compound and of dissolved salts of the electrolyte, and a zinc element, the parts being so combined that the mercury compound will be slowly dissolved and diffuse itself very gradually through the electrolytic paste into amalgamating contact with the zinc element.

3. In a dry battery cell, in combination, a negative element, a depolarizing mass containing mercuric oxid, an electrolytic paste having no mercury compound therein when the battery is first made, and a zinc element, the parts being so combined that the mercury compound will be slowly dissolved by the electrolytic paste and pass through the electrolytic paste into amalgamating contact with the zinc element.

4. In a dry battery cell, in combination, an electrolytic paste containing no mercury compound when the battery is first made, a negative element, a depolarizing mass therefor moistened with a mixture of mercuric oxid and of dissolved salts of the electrolyte, and a zinc element, the parts being so combined that the mercury compound will be slowly dissolved and diffuse itself very gradually through the electrolytic paste into amalgamating contact with the zinc element.

5. The process of amalgamating a zinc element of a galvanic cell which consists in bringing a mercury compound gradually and in very small quantities into contact with the zinc element during the operation of the cell.

6. The process of amalgamating a zinc element of a galvanic cell which consists in bringing mercuric oxid gradually and in very small quantities into contact with the zinc element during the operation of the cell.

In testimony whereof I have affixed my signature in presence of two witnesses.

ALBRECHT HEIL.

Witnesses:
FRANZ HASSLACHER,
MICHAEL VOLK.